April 2, 1968      H. A. MACKIE      3,375,893

SELF-MODULATING FLEXIBLE CHOKE AIR BEARING

Filed Feb. 8, 1965      2 Sheets-Sheet 1

INVENTOR.
Harry A. Mackie
BY
W. F. Wagner
ATTORNEY

April 2, 1968        H. A. MACKIE        3,375,893

SELF-MODULATING FLEXIBLE CHOKE AIR BEARING

Filed Feb. 8, 1965        2 Sheets-Sheet 2

INVENTOR.
Harry A. Mackie
BY
W. F. Wagner
ATTORNEY

United States Patent Office 3,375,893
Patented Apr. 2, 1968

3,375,893
SELF-MODULATING FLEXIBLE CHOKE AIR BEARING
Harry A. Mackie, Birmingham, Mich., assignor to General Motors Corporation, Detroit, Mich., a corporation of Delaware
Filed Feb. 8, 1965, Ser. No. 430,912
17 Claims. (Cl. 180—124)

This invention relates to load supporting devices capable of establishing and maintaining substantially frictionless omnidirectional mobility relative to a surface, and more particularly to devices of the type supported relative to a surface by means of a low pressure free air cushion.

In recent years, numerous types of load supporting air cushion devices have undergone extensive development. Generically termed "ground effect machines" or GEM, these devices are generally grouped in three major classes commonly designated air bearing, plenum chamber and annular jet. In copending application Ser. No. 4,465, Harry A. Mackie et al., assigned to General Motors Corporation, and since abandoned, there is disclosed a modified plenum chamber type air cushion device characterized by the utilization of a generally horizontally extending flexible membrane which is attached centrally and peripherally to a rigid load supporting surface so as to form a depending perimetrical convolution surrounding a central plenum cavity. One or more openings are formed in the membrane at or near the central connection with the load supporting surface so that when the device is energized by the introduction of air under pressure, corresponding superatmospheric air pressure is induced in both the plenum cavity and the annular chamber formed between the load supporting surface and the depending convolution.

Fundamental to successful operation of the above-described device is the necessity of physically restraining the central portion of the membrane to the supporting surface at a vertical level which is above the lowermost extremity of the convolution when the latter is in a distended operating condition. During operation the flexible membrane tends to assume a cross-sectional contour wherein the outer portion thereof assumes a relatively sharp radius which merges into a flat upwardly and inwardly inclined portion terminating at the central connection, rather than tending to assume a semi-circular configuration between the outer and inner margins thereof. Observation and analysis of the device indicates that the membrane profile results from the fact that the opposite surfaces of all portions of the membrane inboard of the choke or throttling gap formed between the ground and the lowermost portion of the convolution are subjected to equal superatmospheric pressure, while the radius portion is subjected to differential pressure between the annular chamber and atmosphere and to the venturi effect of air discharging radially from the plenum through the choke or throttling gap.

Perhaps the most evident and significant characteristic of this device which renders it superior either to conventional plenum chambers utilizing rigid depending side walls or a plenum chamber device utilizing a simple inflated annulus as a depending side wall, is the fact that pressure and load variations as well as changes in angular inclination of the load supporting surface automatically induce membrane profile change which operates to maintain a substantially uniform throttling gap for regulating radial discharge of air from the plenum cavity. Because of this singular self-regulating characteristic, and to descriptively distinguish over such conventional plenum type constructions, as previously mentioned, the term "self-modulating flexible choke air bearing" is utilized. Until very recently it was believed that the functional phenomenon characterized as a self-modulating flexible choke could be achieved only in a construction in which the central portion of the membrane was restrained and communication existed between the plenum cavity and the annular chamber. However, it has now been discovered that under certain conditions comparable functional characteristics may be achieved in a structure in which the central portion of the membrane is not subjected to physical vertical restraint relative to the load supporting surface.

The present invention is, therefore, directed to an improved self-modulating flexbile choke air bearing.

Among the objects of the invention are to provide simplified construction, improved obstacle negotiation capability, and greater resistance to vertical oscillation or "hopping" when subjected to excessive air flow.

An additional object is to provide a construction which, when subjected to load misalignment, displays greater resistance to "grounding out" on the more heavily loaded side.

A further object is to provide a device of the stated character which enables a load to be lifted and maintained in an elevated position prior to establishment of frictionless mobility.

These and other objects, advantages and features of the invention will become more readily apparent as reference is had to the accompanying specification and drawings wherein.

Figure 1:
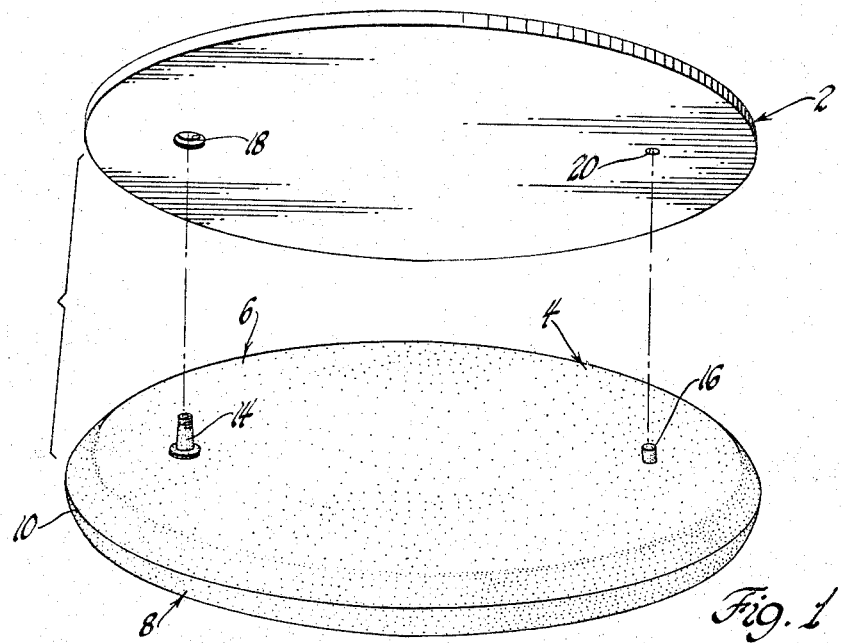
FIGURE 1 is an exploded perspective view of one form of the invention.
Figure 2:
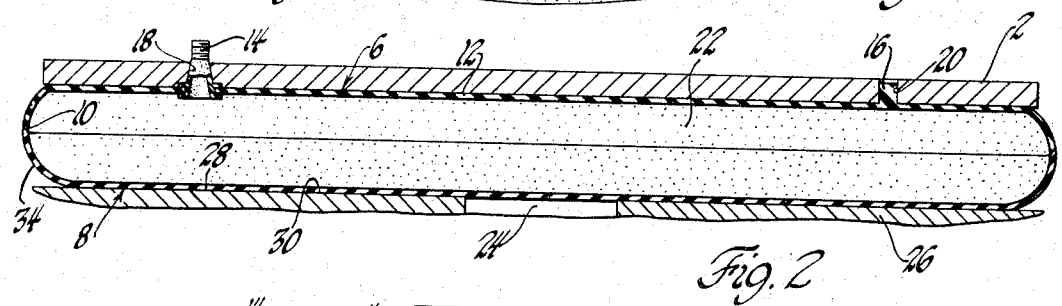
FIGURE 2 is an assembled sectional elevational view of the structure shown in FIGURE 1 illustrating the relationship of the device relative to the ground or supporting surface prior to establishment of a low pressure air cushion between the device and the ground surface.

Referring now to the drawings and particularly FIGURES 1 and 2, there is shown an air bearing device for lifting and supporting a load in frictionless relation to a ground surface, comprising an upper load supporting platform 2 which in assembled relation overlies and is supported on a hollow bladder 4 formed of upper and lower flexible membranes 6 and 8 hermetically sealed together by a continuous overlapping circumferential juncture 10. In the embodiment shown, the platform 2 is formed of a suitable rigid material and has a circular plan form of a diameter substantially corresponding to the diameter of the bladder. To secure the platform against lateral displacement on bladder 4, the horizontal wall portion 12 of upper membrane 6 is provided with an upwardly extending "Shrader" type valve assembly 14 and a projecting lug 16, both of which extend upwardly through registering apertures 18 and 20 in the platform.

To utilize the construction shown to provide substantially friction free omnidirectional mobility of platform 2 and any load which may be imposed thereon, the chamber 22 formed by hollow bladder 4 is first inflated from an external source of air pressure, not shown, via valve assembly 14 until the bladder is erected to form the oblate spheroid configuration shown in FIGURE 2.

Figure 3:
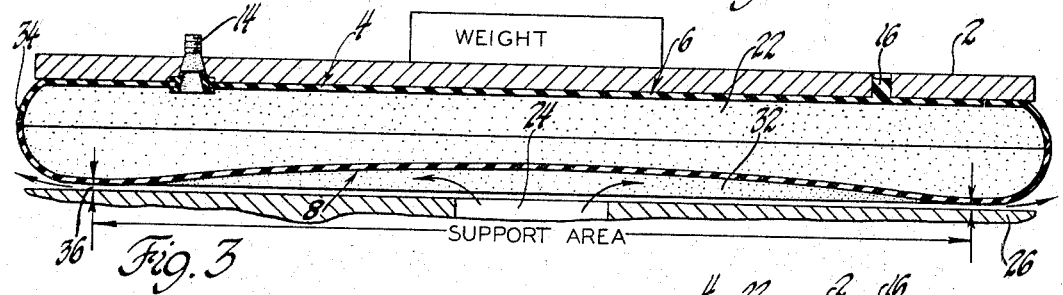
FIGURE 3 is a view similar to FIGURE 2 illustrating the change in configuration arising from establishment of the air cushion.

The pressure thereby established with chamber 22 remains static and initially provides a pneumatic support for the platform and load but does not enable free omnidirectional mobility thereof. However, when, as shown in FIGURE 3, air under pressure is introduced through the opening 24 extending upwardly through the floor 26, the space between the horizontal wall portion 28 of lower membrane 8 and the surface 30 of floor 26 is subjected to superatmospheric pressure which causes wall 28 to be displaced upwardly against the static pressure within chamber 22 and establish a plenum cavity 32. As soon as the pressure within the plenum cavity 32 reaches a level sufficient to offset the total load represented by the bladder, platform and load, the device and its load become buoyantly supported in substantially frictionless relation to the floor. The most significant feature of the phenomenon just described is that air converging through the opening 24 does not merely form a thin lubricating film between the wall 28 and floor surface 30, but rather causes the wall 28 to assume and maintain a dished configuration. Because of the dished configuration assumed by wall 28, a true plenum is formed beneath the major platform area of the device while the portion of the wall 28 immediately adjacent the outer radius portion 34 of the bladder 4 lies in close proximity to the floor surface 30 and establishes a shallow circumferential choke or throttling gap 36 of uniform vertical dimension which circumscribes the plenum cavity 32. From observation and testing of the device, it has been ascertained that the function of the throttling gap 36 and modulation thereof by changes in the contour of wall 28 responsive to load and air pressure change corresponds to that attained by a device of the type disclosed in the aforementioned Mackie et al. application, Ser. No. 4,465. However, with the present construction, establishment and maintenance of the plenum cavity 32 is entirely a function of creation and maintenance of pressure differential between the cavity 32 and the chamber 22 rather than occurring as a result of a physical vertical restraint of the central portion of the lower membrane.

In further testing of the invention, it has been determined that achievement of the physical configuration shown in FIGURE 3 and continued functioning of the device in a buoyant state occur only under conditions wherein the pressure in plenum cavity 32 exceeds the pressure contained within chamber 22. However, this condition is readily attained without difficulty due to the fact that the normal sequence of operation is to first inflate the chamber 22 sufficient to elevate the platform to a desired height and thereafter it is only necessary to adjust the pressure established within chamber 32 until buoyancy occurs. Subsequently, optimum efficiency is attained by reduction in pressure within cavity 32 to a level just sufficient to maintain buoyancy. In this connection, it is to be noted that the device exhibits greatest efficiency of operation and load supporting capability when the flow rate and pressure within cavity 32 is just sufficient to provide omnidirectional mobility. In common with the device of Ser. No. 4,465, excessive pressure created within plenum cavity 32 results in reducing the imaginary circle described by the choke or throttling gap and therefore reduces the effective area over which the pressure within chamber 32 is effective. In the present device, diminution of the effective "foot print" defined by the throttling gap occurs due to the fact that increase in air pressure within cavity 32 causes the wall portion 28 to rise in a more pronounced dished configuration. Consequently, the circumferential portion of wall 28 coinciding with the throttling gap 36 is caused to move radially inwardly to accommodate a foreshortening of the wall caused by the increase in dished configuration. However, unlike the construction of S.N. 4,465, "overblowing" or unnecessarily high pressure within plenum cavity 32 does not result in any substantial increase in elevation of the platform 2.

Figure 4:
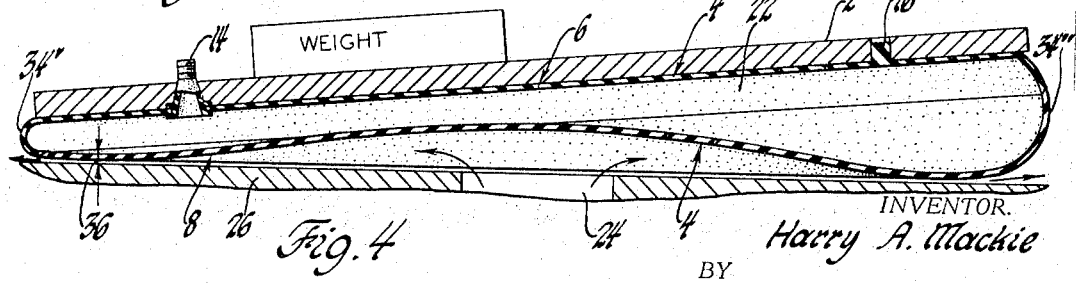
FIGURE 4 is a view similar to FIGURE 3 illustrating the configurational change occurring during operation of the device when subjected to unsymmetrical loading.

FIGURE 4 illustrates the cross-sectional configuration assumed by the device when subjected to unsymmetrical loading relative to its center of gravity. Although the physical appearance of the device is superficially similar to that exhibited by the structure in S.N. 4,465, an exceptionaly significant difference in behavior occurs. Thus, although the radius portion 34' on the more heavily loaded side is greatly reduced while the radius portion 34" on the lightly loaded side significantly increases, due to the fact that virtually no change in radial tension on the dished wall 28 occurs, uniformity of the throttling gap 36 remains substantially the same as that existing under normal uniform load conditions. This characteristic has been found to be of particular significance where the device is utilized in traversing the merger of a horizontal surface with an inclined surface or ramp. Under such conditions, as the device negotiates the initial portion of the ramp, continued uniform radial discharge of air through the adjacent portion of the throttling gap 36 maintains localized lubrication which prevents the leading edge of the radius 34 from frictionally engaging the initial portion of the inclined ramp. In practice it has been found that a bearing construction in accordance with the invention exhibits significantly greater capability of maintaining friction free condition in negotiating horizontal to inclined surfaces than devices heretofore known.

In addition to the foregoing, a construction according to the present invention has been found to be significantly superior to prior art devices in resisting vertical hopping when the plenum cavity 32 is subjected to pressures in excess of that required to frictionlessly support a given load. In contrast to a device in which the lower wall portion is physically connected to the platform, the present invention not only exhibits tolerance to a considerably wider range of pressures within cavity 32, but in addition evidences significantly less severe oscillation even when the range is exceeded.

Figure 5:
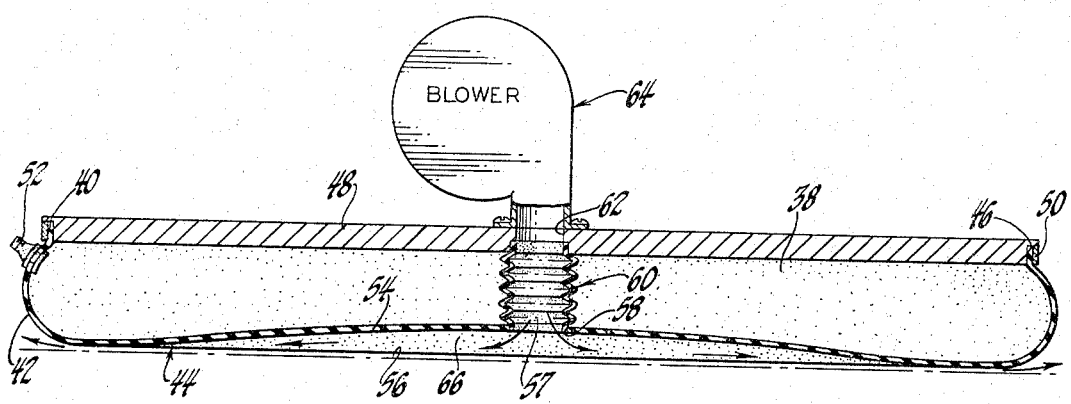
FIGURE 5 is a sectional elevational view of a modified form of the invention.

In FIGURE 5 there is shown a modification of the invention enabling operation thereof over any conventional surface without provision of means for supplying air through prepared openings such as 24. In the construction shown in FIGURE 5, the chamber 38 corresponding to chamber 22 of the structure shown in FIGURE 1 is formed by securing the marginal edge 40 of the radius portion 42 of membrane 44 to the peripheral edge 46 of a rigid platform 48 by an encircling band 50. While shown in the second or freely mobile stage of operation, it will be understood that the device will initially assume a condition similar to FIGURE 1 when chamber 38 is inflated through valve assembly 52. In order to provide for introduction of superatmospheric air into the space between the lower wall portion 54 of membrane 44 and the floor surface 56, the membrane is provided with a central aperture 57, the boundary 58 of which is bonded to the lower end of a freely vertically flexible bellows conduit 60, the opposite end of which is secured in the lower end of an opening 62 formed in platform 48. Disposed over opening 62 is a motor driven blower assembly 64 which operates to provide a continuous flow of air under pressure directed downwardly through bellows 60 into the space between membrane wall 54 and floor 56 with the result that superatmospheric pressure is created therein forming a plenum cavity 66. Since the chamber 38 does not communicate with the interior of bellows 60, pressure developed within plenum cavity 66 is entirely independent of the static pressure established by inflation of chamber 38. Consequently, the dished configuration of the lower wall 54 achieved by the modified construction corresponds directly to that obtained in the form of the invention shown in FIGURE 3 and functions in the same manner as described previously.

Figure 6:
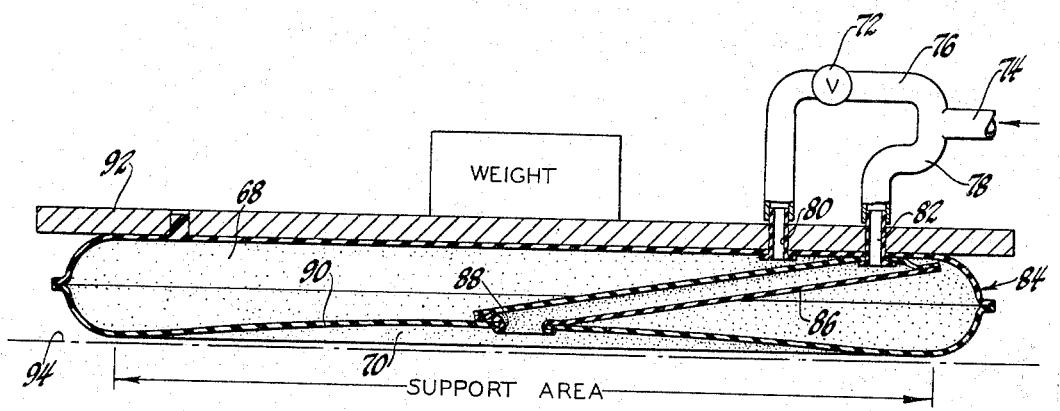
FIGURE 6 is a sectional elevational view of a further modification of the invention.

In FIGURE 6 there is shown a further modification of the invention wherein the requisite separate and differential pressurization of the closed chamber 68 and the plenum cavity 70 is accomplished by selective manipulation of a control valve 72. In this construction, a primary conduit 74 is connected to a source of air pressure, not shown, while separate branch conduits 76 and 78 lead from main conduit 74 to separate ports 80 and 82 which communicate respectively with the interior of chamber 68 in bladder 84 and a flexible hose 86 mounted within bladder 84 and leading to a central discharge opening 88 formed in the lower wall 90 of bladder 84. In this construction it will be seen that static pressure may be established in chamber 68 by maintaining the valve 72 in an open position until elevation of the platform 92 is achieved and thereafter closing the valve. Subsequent continued flow of air through main conduit 74 will be diverted exclusively through branch conduit 78, port 82, flexible hose 86 and into plenum cavity 70 to establish the device in a buoyant omnidirectionally free condition relative to the floor surface 94. Because of the cantilever mounting of hose 86, the latter has virtually no tendency to impose restraint on vertical movement of lower wall portion 90.

Figure 7:
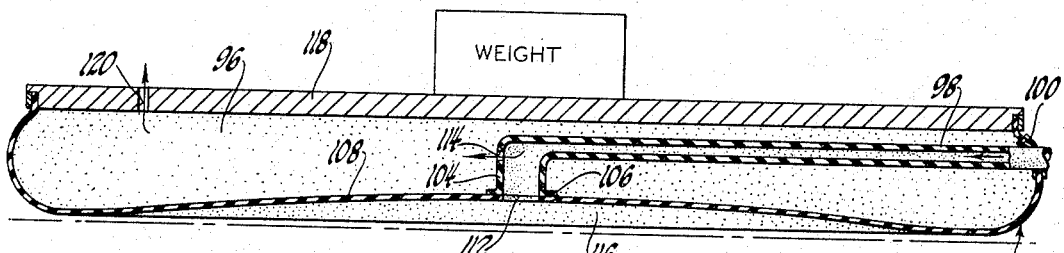
FIGURE 7 is a sectional elevational view of a still further modification of the invention.

In FIGURE 7 there is shown a still further modification of the invention which completely eliminates the necessity for either static pressurization of the chamber 96 or of undertaking inflation thereof as a manually controlled sequential step in operation of the device. In the construction shown, a single flexible conduit 98 sealed to and projecting through the radius portion 100 of membrane 102 extends radially inwardly to the center of the device. At its inner end, conduit 98 is formed with a vertically downwardly directed mouth portion 104 having a flange 106 bonded to the lower wall portion 108 of membrane 102 in alignment with a central opening 112. Formed in the wall of mouth portion 104 in a bleed aperture 114 which enables a portion of superatmospheric air passing through conduit 98 to enter the chamber 96 while the major portion of air flow emerges through opening 112 to establish a superatmospheric cushion within plenum cavity 116. Since as previously pointed out successful operation of the invention depends upon maintenance of a higher pressure within plenum cavity 116 than the pressure existing within chamber 96, the platform 118 is formed with an opening 120 which is calibrated to maintain a pressure level in chamber 96 slightly lower than the pressure maintained in plenum cavity 116.

From the foregoing it will be seen that a novel, improved and simplified air bearing device has been devised which not only exhibits performance capabilities and characteristics superior to devices of the type heretofore available, but in addition is susceptible to a wide range of structural forms.

While several embodiments of the invention have been shown and described, it will be apparent that other changes and modifications may be made therein. It is, therefore, to be understood that it is not intended to limit the invention to the embodiments shown, but only by the scope of the claims which follow.

I claim:

1. A fluid cushion load supporting device adapted to be disposed between a load and a surface comprising, a hollow body including an impervious flexible membrane having a major portion thereof disposed in vertically unrestrained proximate relation to said surface, means for establishing and maintaining a first fluid pressure in said hollow body, and means for establishing and maintaining a second fluid pressure between said membrane and said surface greater than said first fluid pressure causing said major portion of said membrane to assume a concave configuration cooperating with said surface to establish a circumferential throttling gap providing the sole means of regulating discharge of said second fluid pressure to atmosphere.

2. A fluid cushion load supporting device comprising, a hollow body including an upper load supporting portion and an impervious flexible membrane having a vertically unrestrained lower wall portion disposed in proximate relation to a surface, means for establishing and maintaining a first fluid pressure in said hollow body, and means for establishing and maintaining a second fluid pressure between said membrane and said surface greater than said first fluid pressure causing said membrane to assume a concave configuration cooperating with said surface to establish a circumferential throttling gap providing the sole means of regulating discharge of said second fluid pressure to atmosphere.

3. An air cushion load supporting device comprising, a platform, a hollow body disposed beneath said platform including a flexible impervious membrane having a generally horizontal vertically unrestrained lower wall portion disposed in proximate relation to a surface, means for establishing and maintaining a first fluid pressure in said hollow body, and means for establishing and maintaining a second fluid pressure between said membrane and said surface greater than said first fluid pressure, whereby said generally horizontal wall portion assumes a concave configuration cooperable with said surface to form a plenum cavity with a radial outer portion of said wall coincidentally establishing a circumferential throttling gap operable to regulate radial discharge of fluid pressure from said plenum.

4. An air cushion load supporting device comprising, a closed hollow body including a rigid upper load carrying wall and a flexible impervious membrane forming upturned side walls and a generally horizontal vertically unrestrained lower wall portion disposed in proximate relation to a surface, means for establishing and maintaining a first fluid pressure in said hollow body, and means for establishing and maintaining a second fluid pressure between said membrane and said surface greater than said first fluid pressure causing said membrane to assume a concave configuration cooperating with said surface to establish a circumferential throttling gap providing the sole means of regualting discharge of said second fluid pressure to atmosphere.

5. A self-modulating flexible choke air bearing comprising, a flexible bladder disposed beneath a load in proximate relation to a surface, means for establishing and maintaining a first fluid pressure in said bladder, and means for establishing and maintaining a second fluid pressure between said bladder and said surface greater than said first fluid pressure causing the portion of said bladder adjacent said surface to assume a concave configuration establishing a circumferential throttling gap providing the sole means of regualting discharge of said second fluid pressure to atmosphere.

6. An air cushion load supporting device comprising, a hollow impervious flexible oblate spheroid disposed beneath a load bearing member in proximate relation to a surface, means for establishing and maintaining a first fluid pressure in said spheroid, and means for establishing and maintaining a second fluid pressure between said spheroid and said surface greater than said first fluid pressure causing the portion of said spheroid adjacent said surface to assume a concave configuration cooperating with said surface to establish a circumferential throttling gap providing the sole means of regulating discharge of said second fluid pressure to atmosphere.

7. The structure set forth in claim 6 wherein said spheroid is formed of mating upper and lower portions hermetically joined together by a continuous circumferential lap joint.

8. An air cushion load supporting device comprising, a hollow impervious flexible oblate spheroid disposed beneath a rigid load bearing member in proximate relation to a surface, means for establishing and maintaining a static fluid pressure in said spheroid, and means for establishing and maintaining a dynamic fluid pressure between said spheroid and said surface greater than said static pressure causing the portion of said spheroid adjacent said surface to assume a concave configuration cooperating with said surface to establish a circumferential throttling gap providing the sole means of regulating discharge of said second fluid pressure to atmosphere.

9. An air cushion load supporting device comprising, a hollow body including a rigid load gearing member and an impervious flexible vertically unrestrained wall portion disposed in proximate relation to a surface, means for establishing and maintaining a first fluid pressure in said body, and vertically displaceable means extending through said hollow body for establishing and maintaining a second fluid pressure between said flexible wall portion and said surface greater than said first fluid pressure causing said wall portion to assume a concave configuration cooperating with said surface to establish a circumferential throttling gap providing the sole means of regulating discharge of said second fluid pressure to atmosphere.

10. An air cushion load supporting device comprising, a hollow body including a rigid load bearing member and an impervious flexible vertically displaceable wall portion disposed in proximate relation to a surface, conduit means extending through said hollow body for establishing and maintaining a dynamic fluid pressure between said flexible wall portion and said surface, and passage means associated with said last mentioned means automatically operable to establish and maintain fluid pressure in said body slightly less than said dynamic pressure.

11. The structure set forth in claim 10 wherein said passage means includes a first opening providing a restricted communication between said conduit means and the interior of said hollow body and a second opening in said hollow body providing restricted communication between said body and atmosphere.

12. An air cushion load supporting device comprising, a hollow body including an upper load bearing portion and a lower impervious flexible generally horizontal vertically displaceable wall portion disposed in proximate relation to a surface, means for establishing and maintaining a first fluid pressure in said body, and freely vertically deflectable means extending through said hollow body in noncommunicative relation with the interior thereof for establishing and maintaining a second fluid pressure between said flexible wall portion and said surface greater than said first fluid pressure.

13. The structure set forth in claim 12 wherein said means extending through said hollow body comprises a vertically flexible bellows conduit.

14. A surface proximate air cushion load supporting device comprising, a load carrying member, a statically inflated flexible oblate spheroid disposed between said member and said surface, and means for establishing and maintaining dynamic fluid pressure between said spheroid and said surface exceeding the static pressure within said spheroid, said last mentioned means comprising a flexible tube externally sealed to and extending angularly through said spheroid, said tube opening downwardly to atmosphere substantially horizontally midway of said spheroid.

15. The method of supporting a load in frictionless relation to a surface comprising the steps of forming a flexible hollow body under said load, inflating said body to establish static gas pressure therein capable of elevating the load a predetermined distance above said surface, sealing the body to maintain said static gas pressure, and inducing gas flow between said body and said surface at a pressure sufficient to cause said body to form a concave configuration cooperable with said surface with the radial outer portion thereof establishing a circumferential throttling gap regulating radial discharge of said induced gas flow.

16. A load supporting ground proximate air bearing comprising, a sealable pneumatic cushion including an upper load supporting surface and a lower unrestrained flexible horizontal wall portion normally abutting the ground throughout its entire area, conduit means for introducing air flow into said cushion and between the ground and said wall portion, and means in said conduit means operable to interrupt flow to and seal said cushion while maintaining flow between the ground and said wall portion.

17. In a ground proximate air bearing, the combination of a load supporting platform, a sealed pneumatic cushion disposed beneath said platform having an unrestrained flexible horizontal wall portion normally abutting the ground throughout its entire area, means for introducing air flow between the ground and said wall portion at a pressure higher than the pressure within said pneumatic cushion, and vertically separable horizontally engaging interlocking means on said platform and cushion.

References Cited
UNITED STATES PATENTS

| 3,081,886 | 3/1963 | Flexman et al. | 180—7 |
| 3,182,739 | 5/1965 | Cockerell | 180—7 |
| 3,200,898 | 8/1965 | Dobbertien | 180—7 |
| 3,232,366 | 2/1966 | Cockerell | 180—7 |
| 3,253,667 | 5/1966 | Mackie | 180—7 |

A. HARRY LEVY, *Primary Examiner.*

BENJAMIN HERSH, *Examiner.*

M. S. SALES, *Assistant Examiner.*